July 25, 1939.  J. A. BUMPUS ET AL  2,167,263

BUMPER CLIP AND INSTALLATION THEREOF

Filed Nov. 2, 1938

Inventors:
Jesse Allen Bumpus,
Clifford S. Christiansen,
by Walter P. Jones
Att'y Patented July 25, 1939

2,167,263

UNITED STATES PATENT OFFICE 2,167,263

BUMPER CLIP AND INSTALLATION THEREOF

Jesse Allen Bumpus, Pleasant Ridge, and Clifford S. Christiansen, Detroit, Mich., assignors to Collord, Inc., Detroit, Mich., a corporation of Michigan Application November 2, 1938, Serial No. 238,450

7 Claims. (Cl. 16—86)

This invention relates to bumper clips of the type adapted to be applied to a support such as provided by the radiator shell or engine shell of an automobile and to installations of the clips.

An object of our invention is the provision of a bumper clip adapted to be detachably secured to a support and comprising a metal fastening member provided with a covering of non-metallic material, such as rubber, which not only affords adequate cushioning between parts, such as the hood of an automobile and a hood support, but, also effects a resilient and anti-rattle fastener adjustment between the support and cooperating attaching portions of the bumper clip when the clip is secured to the support.

Other objects and purposes of our invention will be apparent from inspection of the drawing and specification hereinbelow set forth.

Referring to the drawing, in which we have illustrated a preferred embodiment of our invention:

Fig. 2 is an enlarged top view of one of our improved bumper clips secured to a support such as the hood-supporting flange shown in Fig. 1;

Fig. 3 is a sectional view along the line 3—3 of Fig. 2 showing a part such as the hood of an automobile cushioned upon the exposed surface of the bumper clip;

Fig. 4 is a front plan view of our improved bumper clip per se;

Fig. 5 is a bottom plan view of the bumper clip per se; and

Fig. 6 is an end plan view of the bumper clip per se.

Figure 1:
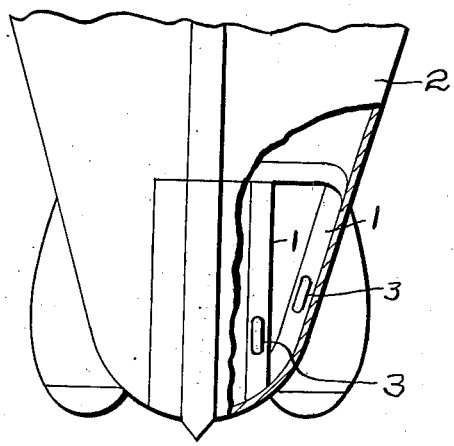
Fig. 1 is a fragmentary plan view showing a vehicle front having hood-supporting flanges carrying our improved bumper clips with the clips drawn slightly larger than preferred size in proportion to the other parts of the automobile and the hood.
Figure 1:
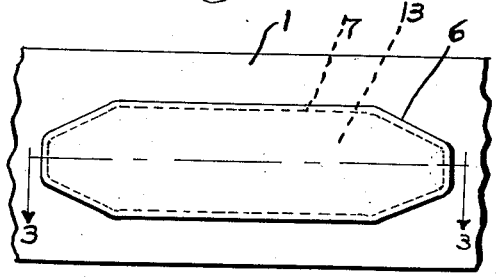
Figure 1:
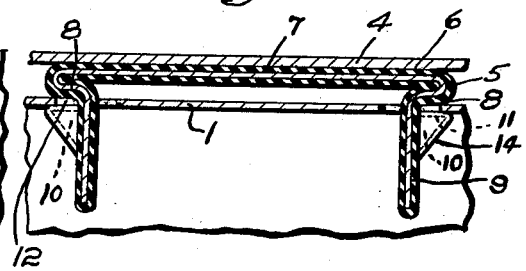
Figure 1:
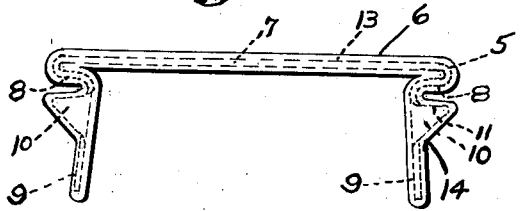
Figure 1:
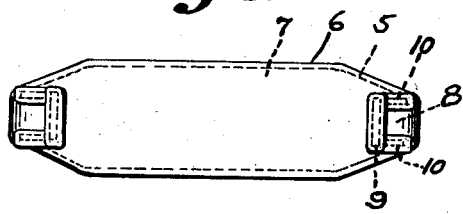
Figure 1:
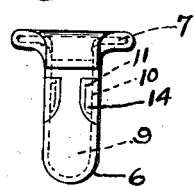

Referring to the drawing, we have illustrated a portion of the body of an automobile showing hood-supporting flanges 1 extending inwardly from the radiator and engine shell and a hood 2 having flange portions (Fig. 3) adapted to be supported by the flanges 1. In our preferred form shown in the drawing each of the flanges 1 carries one of our improved bumper clips 3 which is detachably assembled with the flange and adapted to provide a cushion so as to prevent metal-to-metal contact between the flanges 1—1 and hood flanges 4 (Fig. 3) which are supported by the flanges 1—1 when the hood is down.

Referring to our improved bumper clip per se, we have provided one of relatively simple construction which comprises a metal body portion 5 having a covering 6 of resilient non-metallic material, such as rubber, which is preferably applied by dipping the metal body 5 into liquid latex, preferably liquid rubber latex so compounded as to produce a rubber film which is then vulcanized. We prefer a covering for the bumper formed of liquid latex rather than of molded rubber as the latex can be put on more economically and effects a more resilient coating for a purpose hereinafter described. The metal body portion 5 of our improved bumper clip preferably comprises an elongated flat plate portion 7 having attaching portions extending beneath the plate portion comprising folded-under portions 8—8 at opposed ends and leg portions 9—9 integral with the inner ends of the folded-under portions 8—8 extending away from the plate portion 7. Each of the leg portions 9 has laterally-extending portions 10—10 formed adjacent opposite edges of the leg and extending in substantially right-angular relation to the plate thereof. Each of the laterally-extending portions 10 provides a shoulder 11 at its upper edge substantially facing the plate portion 7 and adapted to be moved through openings 12 (Fig. 3) of the support to a position behind a surface of the support in attachment of the bumper clip thereto, as most clearly shown in Fig. 3. One of the features of our invention lies in the fact that the rubber covering 6 covers not only the top surface 13 of the base portion 7 so as to provide a cushion on the exposed surface of the bumper, but, also, the folded-under portions 8 and the laterally-extending portions 10—10 of the attaching portions. As a result of coating the folded-under portions 8—8 and the laterally-extending portions 10—10 with the relatively resilient latex covering, the natural tensional qualities of the rubber increases the spring action of the adjustment when the attaching portions of the bumper are engaged with the support 1 and, at the same time, the covering of the shoulder 11 engaging the lower surface of the support 1 and the covering of the folded-under portions 8—8 engaging the upper surface of the support 1 serve to quiet the assembly and prevent rattle between the parts as a result of vibration of the automobile.

Assembly of our improved bumper clips to the support is a relatively simple matter and may be carried out through moving the rubber-coated attaching portions through the apertures 12 of the support. During this action the camming edges 14 of the coated laterally-extending portions 10 engage the edges of the apertures 12 to contract the legs 9—9 against the spring tension set up by the folded portions 8—8 so as to move the rubber-covered laterally-extending portions through the aperture. After passage through the aperture, the coated folded-under portions 8—8 engage the upper surface of the support 1 and the legs 9—9 expand to engage the covered shoulders 11 of the portions 10—10 against the lower surface of the support. Thus the resiliency of the attaching portions of the metal body 5, coupled with the inherent tensional qualities of the rubber covering 6, serve to detachably attach the bumper clip in firm assembly with the supporting part. When the bumper clip has been secured to the support, the exposed covered surface of the base portion 7 is adapted to provide an anti-squeak cushion for the hood flange 4, as suggested in Fig. 3.

Although we have illustrated and described a preferred form of our invention, we do not wish to be limited thereby because the scope of our invention is best defined by the following claims.

We claim:

1. A bumper clip of the class described comprising a metal plate portion having integral folded-under portions and leg portions integral with the inner ends of said folded-under portions extending away from said plate portion, said leg portions having means adapted to be disposed opposite a surface of a supporting part whereby said clip member is secured to said part, and said plate portion having a covering of non-metallic material.

2. A bumper clip of the class described comprising a metal plate portion and attaching portions extending beneath said plate, at least one of which is yieldable, having laterally-projecting means adapted to be disposed opposite a surface of a supporting structure whereby said clip member is secured to said structure, and said plate portion having a covering of resilient material of the nature of latex rubber.

3. A bumper clip of the class described comprising an elongated metal plate portion having folded-under portions at opposed ends, leg portions integral with inner ends of said folded-under portions extending away from said plate portion, said leg portions having shoulder means adapted to be disposed opposite a surface of a supporting structure whereby said clip member is secured to said structure, and said plate portion, said folded-under portions and said shoulders of said legs having a covering of resilient material of the nature of rubber.

4. In combination with an apertured supporting structure, a bumper clip having a plate portion disposed on one side of said structure, said plate portion having a covering of non-metallic material and attaching portions extending from said plate portion through said supporting structure, and said attaching portions having means disposed opposite an opposite surface of said supporting structure from said plate portion for securing said clip member to said supporting structure.

5. In combination with an apertured supporting structure, a bumper clip having a metal plate portion disposed on one side of said structure, said plate portion having a covering of non-metallic material, and leg portions extending away from said plate portion through said supporting structure, said leg portions having laterally-projecting means disposed opposite a surface of said supporting structure for securing said clip member thereto, and said laterally-projecting means of said leg portions having a covering of resilient material of the nature of rubber engaging said supporting structure so as to provide an anti-rattle attachment.

6. In combination with an apertured supporting structure, a bumper clip having a metal plate portion disposed on one side of said structure and resilient attaching portions extending from said plate portion through said supporting structure, said attaching portions having shoulders disposed opposite an opposite surface of said supporting structure from said plate portion, and said plate portion and said attaching portions having a covering of resilient material of the nature of rubber, said covering of said attaching portions being in engagement with said supporting structure for increasing the resiliency of the fastening and providing an anti-rattle attachment.

7. An anti-rattle device in the nature of a snap fastener having a plate-like portion, at least two legs extending from said plate portion for engagement with a support and each leg having integral means for attaching the device to the support and at least one leg being yieldable to provide for the snap attachment and at least the plate portion of said device having a covering of non-metallic material applied thereto for the purpose described.

JESSE ALLEN BUMPUS.
CLIFFORD S. CHRISTIANSEN.